(No Model.)
J. H. DALZELL.
UNDERGROUND ELECTRIC CABLE.
No. 369,320. Patented Sept. 6, 1887.
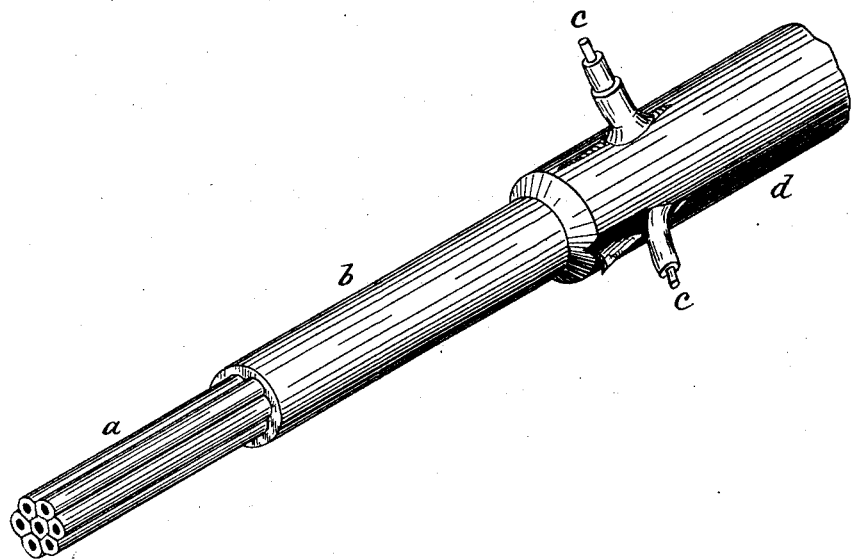
Witnesses:—
Alexander Ross
Philip Frank
John H. Dalzell.
Inventor,
Thos. J. McTighe,
Attorney.

UNITED STATES PATENT OFFICE.

JOHN HENRY DALZELL, OF PITTSBURG, PENNSYLVANIA.

UNDERGROUND ELECTRIC CABLE.

SPECIFICATION forming part of Letters Patent No. 369,320, dated September 6, 1887.

Application filed November 26, 1886. Serial No. 219,963. (No model.)

*To all whom it may concern:*

Be it known that I, JOHN HENRY DALZELL, a citizen of the United States, residing at Pittsburg, in the county of Allegheny and State of Pennsylvania, have invented certain new and useful Improvements in Underground Electric Cables; and I do hereby declare the following to be a full, clear, and exact description of the invention, such as will enable others skilled in the art to which it appertains to make and use the same.

In laying and using underground cables it is difficult to get at single wires to branch into buildings, and especially so where it is a lead-covered cable; and in a cable of considerable length—say one-half mile long—if at various points we branch out individual wires whose return-circuit is provided by a ground-connection, all the remainder of the respective lengths of said individual wires are dead, and become a sheer waste under all ordinary conditions. I propose to avoid this waste, especially on telephone-cables where branches will be numerous.

My invention consists in manufacturing the cable with the wires starting at one end equal to the whole number to be in the cable, some of the wires running only part of the length of the cable and others the full length, the shorter wires being arranged to end at the desired point or points, and taken out through the cable-envelope and adapted to be connected to the branch or branches to enter buildings as desired.

The invention further consists in an electric cable constructed with wires or conductors of different lengths, whether sheathed or otherwise, all substantially as hereinafter fully described and claimed.

In the drawing, the figure represents in perspective my improved form of cable with varied lengths of conductors.

The starting end of cable is shown at *d*, which in this case contains, say, thirteen (13) conductors. At *c* six (6) of these stop, and their ends are brought out, as shown, for convenient connection to their respective branches. The remaining seven conductors continue on, as at *a*, the sheathing being reduced in diameter to correspond, as at *b;* and farther on any one or more of the seven may be made to end at any desired point.

The wires *a* are all independently insulated in any suitable manner.

In the use of such a cable with wires of variable length the lead covering may be slightly opened for the extraction of the ends *c*, (which would lie close under the lead casing;) or the entire casing may be removed, and after all connections have been made a "wipe-joint" may be applied to the gap.

Such a cable is particularly useful and economical in telephonic work. The central office can send out a main cable designed with such number of wires and variations of length as to drop them just where wanted, and hence there is no loss of wire or covering material.

I claim as my invention—

1. An electric cable composed of a number of insulated wires of different lengths, arranged in concentric groups, the shortest group being on the outside and the longest at the center, substantially as described.

2. An electric cable composed of a number of insulated wires of different lengths inclosed in a continuous lead envelope surrounding the same and compressed thereon, substantially as described.

3. An electric cable composed of a number of insulated wires diminishing in length and number between one end and the other and a lead casing or sheath surrounding the same, and correspondingly diminishing in diameter, substantially as set forth.

In testimony whereof I affix my signature in presence of two witnesses.

JOHN HENRY DALZELL.

Witnesses:
J. A. CHAMBERS,
K. T. MEAD.